United States Patent
Jessee et al.

(10) Patent No.: US 9,246,756 B2
(45) Date of Patent: Jan. 26, 2016

(54) DYNAMIC FILTERS FOR POSTED EVENT MESSAGES INITIATED AUTOMATICALLY BY EQUIPMENT

(71) Applicant: FrontRange Solutions USA Inc., Milpitas, CA (US)

(72) Inventors: Randy Jessee, Tracy, CA (US); Udo Waibel, Los Altos, CA (US); Suresh Pandian, Sunnyvale, CA (US)

(73) Assignee: HEAT Software USA Inc., Milpitas, CA (US)

( * ) Notice: Subject to any disclaimer, the term of this patent is extended or adjusted under 35 U.S.C. 154(b) by 125 days.

(21) Appl. No.: 13/974,748

(22) Filed: Aug. 23, 2013

(65) Prior Publication Data

US 2015/0058472 A1 Feb. 26, 2015

(51) Int. Cl.
*G06F 15/173* (2006.01)
*H04L 12/24* (2006.01)
*H04L 12/58* (2006.01)
*H04L 12/26* (2006.01)

(52) U.S. Cl.
CPC ............ *H04L 41/0686* (2013.01); *H04L 43/04* (2013.01); *H04L 51/16* (2013.01)

(58) Field of Classification Search
CPC ........ H04L 41/02; H04L 41/06; G06Q 10/06; G06Q 10/063112; H04M 3/2254; B60R 25/04
USPC .......... 709/206, 224; 705/7.14, 7.13; 714/4.2, 714/48; 340/506; 379/229
See application file for complete search history.

(56) References Cited

U.S. PATENT DOCUMENTS

| | | | | |
|---|---|---|---|---|
| 4,965,772 A * | 10/1990 | Daniel et al. | ................... | 709/224 |
| 5,519,830 A * | 5/1996 | Opoczynski | ................... | 714/4.2 |
| 5,696,486 A * | 12/1997 | Poliquin et al. | ............... | 340/506 |
| 6,477,667 B1 * | 11/2002 | Levi | ........................ | B60R 25/04 714/48 |
| 8,560,369 B2 * | 10/2013 | Messer | ........................ | 705/7.14 |
| 8,943,154 B1 * | 1/2015 | Bodell et al. | ................... | 709/206 |
| 2003/0206620 A1 * | 11/2003 | Taylor | ................. | H04M 3/2254 379/229 |
| 2004/0054776 A1 * | 3/2004 | Klotz et al. | ..................... | 709/224 |
| 2004/0148385 A1 * | 7/2004 | Srinivasan et al. | ............ | 709/224 |
| 2010/0312604 A1 * | 12/2010 | Mitchell | ................ | G06Q 10/06 705/7.13 |
| 2013/0275169 A1 * | 10/2013 | Acres | ..................... | G06Q 10/06 705/7.14 |

* cited by examiner

*Primary Examiner* — Dustin Nguyen
(74) *Attorney, Agent, or Firm* — Patent Law Group LLP; Brian D. Ogonowsky

(57) ABSTRACT

A system and method is disclosed for improving the efficiency of a service department when maintaining equipment. The equipment performs self-diagnosis and periodically reports a problem or other event by automatically generating an event code indicating that an event has occurred that requires maintenance of the equipment. The system then automatically posts initial information about the event on a secure message board, such as within the company's website, for access by one or more authorized personnel via a network. The event code is applied to a look-up table pre-programmed with rules identifying authorizations of certain personnel to receive posted information about the event and to contribute to a posting thread. A communications controller then applies the rules to the thread as the event is being resolved by the authorized personnel. Authorized personnel are allowed to dynamically modify the rules after the posting of the initial information.

20 Claims, 3 Drawing Sheets

| Event and equipment code automatically generated | Initial recipients of post identifying event to be resolved | Allow contribution to thread | Recipients of full thread | Allow access to full thread but not participate | Allow to change participants in thread | Allow to change look-up table for future threads | Authorization for closing out event |
|---|---|---|---|---|---|---|---|
| $$$123 | A, B, C, D | A, B, C | B, C | A | A, B | A | A |
| . . . | | | | | | | |
| ###123 | A, E, F, G | A, E, G | E, G | A | A, G | A | A |

Fig. 3

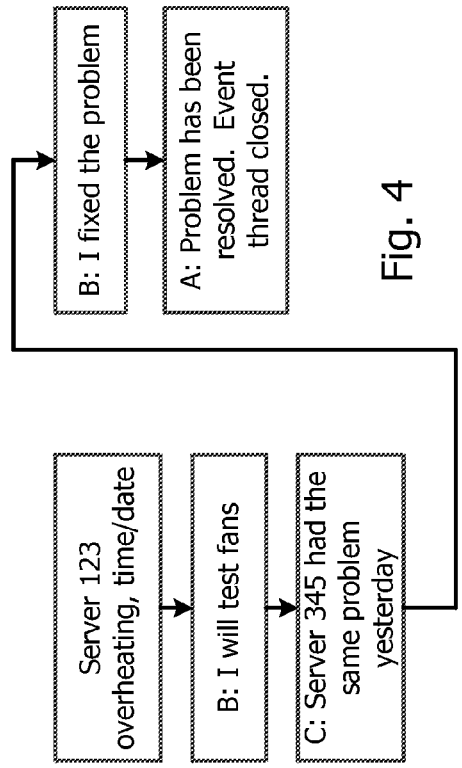

Fig. 4

DYNAMIC FILTERS FOR POSTED EVENT MESSAGES INITIATED AUTOMATICALLY BY EQUIPMENT

FIELD OF THE INVENTION

This invention relates to the servicing of equipment, such as servers, where the equipment automatically generates event codes identifying an issue to be resolved.

BACKGROUND

Modern electronic equipment, such as servers, perform self-diagnostic routines and generate event flags when something is wrong. Events may include over-heating, data errors above a threshold, data delays, etc. Such events are then communicated to a computer, typically directly connected to the equipment, and the computer screen displays the event message. A technician in a service department then views the event message and takes the appropriate steps to resolve the event. One possible step is for the technician to post the event in the company's network, on-line, or in an email so the proper personnel or group can help resolve the event.

Various people may receive the thread of the related posts between the technical personnel, and some of the people may not be relevant to the problem to be resolved. As a result of unnecessary people being involved in the issue, or the omission of people that should be involved in the issue, efficiency is lowered and response time may be extended.

In a service environment, response time and efficiency are critical to maintain agreed upon service levels.

What would be desirable is a communication system for detecting events automatically generated by equipment, such as events identifying a problem to be solved, and controlling access to the information generated during the resolution of the event so only the proper personnel can be involved in resolving the problem.

U.S. Patent Publication No. 2013/0061156, assigned to Salesforce.com, describes a social network system directed to sales people that includes filters for determining who is authorized to participate in or receive threads (related to sales issues), but such threads are initiated by human users who specify the desired filters. Such a system is not appropriate for resolving events totally initiated by equipment.

SUMMARY

The present invention aids a service department, tasked with maintaining equipment, in resolving events requiring maintenance of equipment. The system and method of the invention improve the efficiency of the service department and thus improves the reliability and up-time of the equipment being serviced.

In one embodiment, a server (or other equipment) is connected to a communications network and a communications controller. The network may be the Internet or a network internal to a company.

The server performs self-diagnostics and, in the event of a problem or need for maintenance, the server generates a specific event code identifying the type of event and the server.

Software files are then cross-referenced by the event code. The files include a look-up table associated with the particular event and the particular server. The table cross-references (or maps) the event code with the various personnel (and/or groups) that are relevant in resolving the event. A communications controller associated with the server then posts the event (e.g., event code plus description, time, etc.) on a message board and informs the authorized personnel identified in the table. The authorized personnel may then interact with each other by posting messages to the thread relating to resolving the event. The pre-programmed table provides rules (filters) for the thread and may designate, for example, 1) the initial recipients of the event posting; 2) the personnel authorized to actively post to the thread; 3) the personnel to be notified about the high level status of the event; 4) the personnel authorized to change the access to the thread; 5) the personnel authorized to change the table; and 6) the personnel authorized to provide notice that the event is resolved.

Any rules may be provided in the look-up tables. Different personnel may be authorized (mapped) to receive different postings, depending on the particular event (e.g., a technical problem or a maintenance reminder) and the location of the equipment. The initial posting by the communications controller may identify the personnel involved and the relevant rules so the recipients may determine if the rules are appropriate. Appropriate password protection may be used to restrict access to only the authorized personnel. The table may be changed remotely through the network, as needed, due to personnel changes, etc.

The authorization to participate in the threads or be able to access the thread may dynamically change based on the status. For example, the authorizations may be initially established by the look-up table and then changed by an authorized user.

The mapping in the table may be for any combination of individuals or groups, where all personnel in the group receive the same communication as a broadcast.

The invention is equally applicable to all equipment that initiates a post without human involvement.

Various other embodiments are described.

BRIEF DESCRIPTION OF THE DRAWINGS

FIG. 3 illustrates a simplified look-up table cross-referencing the event/equipment code with the various rules/filters for the notification, ensuing thread, and event resolution.

FIG. 4 is a simple thread initiated by a server.

Elements that are the same or equivalent are labeled with the same numeral.

DETAILED DESCRIPTION

Figure 1:
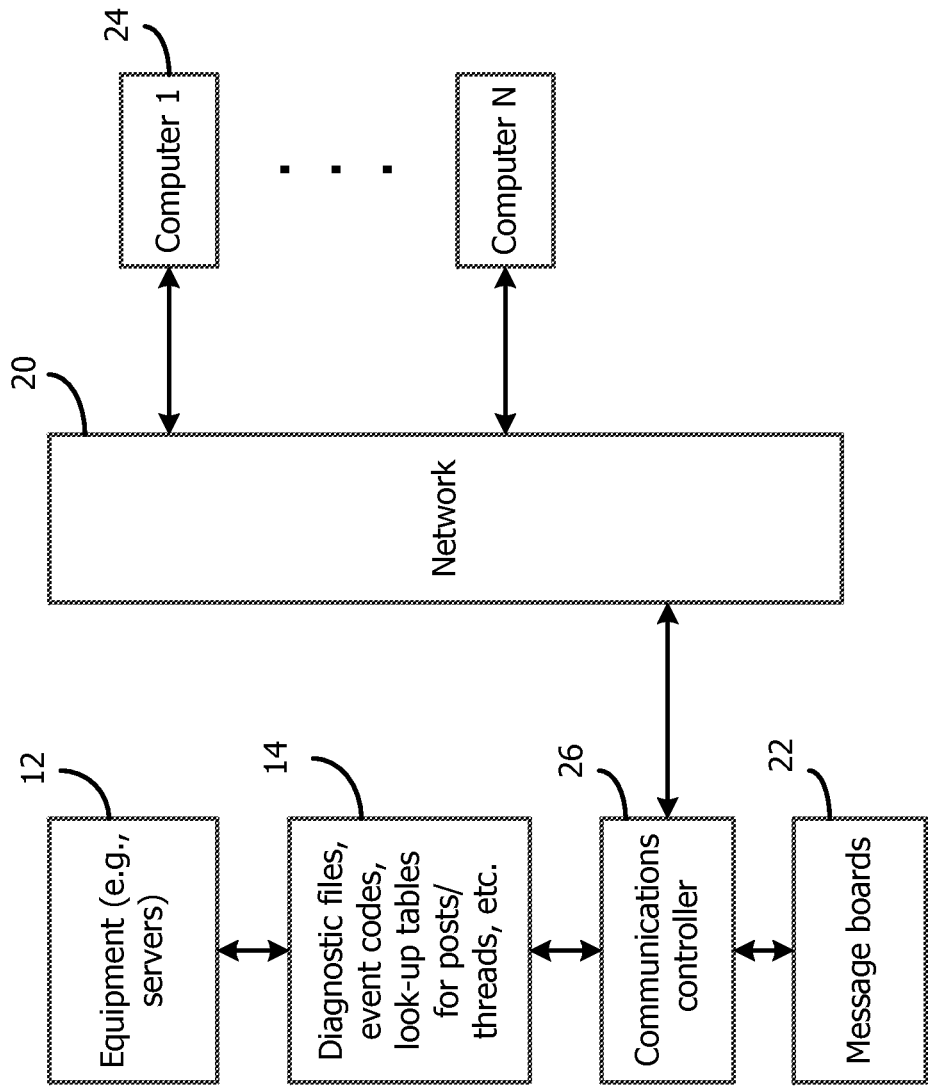
FIG. 1 illustrates a system in accordance with one embodiment of the invention.

FIG. 1 illustrates a system in accordance with one embodiment of the invention. The system may be completely contained within a building and interconnected by a local area network or the Internet, or the system may be comprised of remote components connected by a wide area network, including the Internet.

Equipment 12 can be any equipment, such as servers, communication equipment, or other processing equipment, that periodically require maintenance and, in response to a self-diagnostics routine, automatically generate messages identifying the problem to be fixed. Such a message may be an error message (e.g., part has failed, bit error rate too high, etc.), a warning message (e.g., overheating), a reminder for periodic maintenance (e.g., replace hard drive), or other message.

In a service desk environment, rapid response to the message is important since reliability or up-time of the equipment must be high (e.g., 99.9999). For organizations with a large amount of equipment (e.g., Google, Facebook, ebay, Government, etc.), whether in one room or spread out, there may be many individuals involved in maintaining the equipment. Further, there are other people, such as supervisors and manufacturing representatives, that do not physically maintain the equipment but may need to know high level information about the equipment issues. In an organization with hundreds of people maintaining equipment, some of the people will be more appropriate than others for responding to an equipment message, some appropriate people may not be available to respond to the message, and other issues occur which greatly complicate the maintenance issue. Some maintenance issues must be responded to immediately.

Presently, much of the coordination of maintenance is through human involvement in assigning a maintenance task to an available person.

The present invention greatly improves the efficiency of such a maintenance organization as described below.

In the example of FIG. 1, the equipment 12 includes processing circuitry that runs various software files. The files that relate to the present invention are included in the block 14, which includes diagnostic files, event codes that identify a problem and the equipment, and look-up tables for cross-referencing (or mapping) the error/equipment with the addresses of particular individuals or groups of individuals. The addresses depend on the means of communication within the organization. The addresses may be e-mail addresses, cell phone numbers, social network addresses, computer addresses, website URLs, etc. In one embodiment, the organization supports a secure social network for maintenance issues that enables the users to post messages in a thread relating to a particular issue to be resolved. Posting to threads is very common in social websites for exchanging ideas, where users log onto the website, perhaps with a password, click through a menu to find a particular issue of interest and post messages. Multiple users can post messages, creating a thread of messages.

In one embodiment, the organization's social network for maintenance issues is augmented with the present invention. In the example used, the organization's maintenance facility uses a secure web site hosted by a server and accessible via the Internet. In the event of a maintenance issue, the maintenance personnel may log onto the site and view threads related to different maintenance issues. Notification of a thread or a new post may be by visually seeing the post or being automatically notified via e-mail about the new post. Many other ways of such notification are possible.

The equipment 12 periodically or continuously runs the software in block 14 to detect problems. When a problem is discovered, the software associates the problem with a pre-assigned event code and equipment identifier (ID) code, where the codes can be used by the maintenance staff to identify the problem and equipment.

Figure 2:
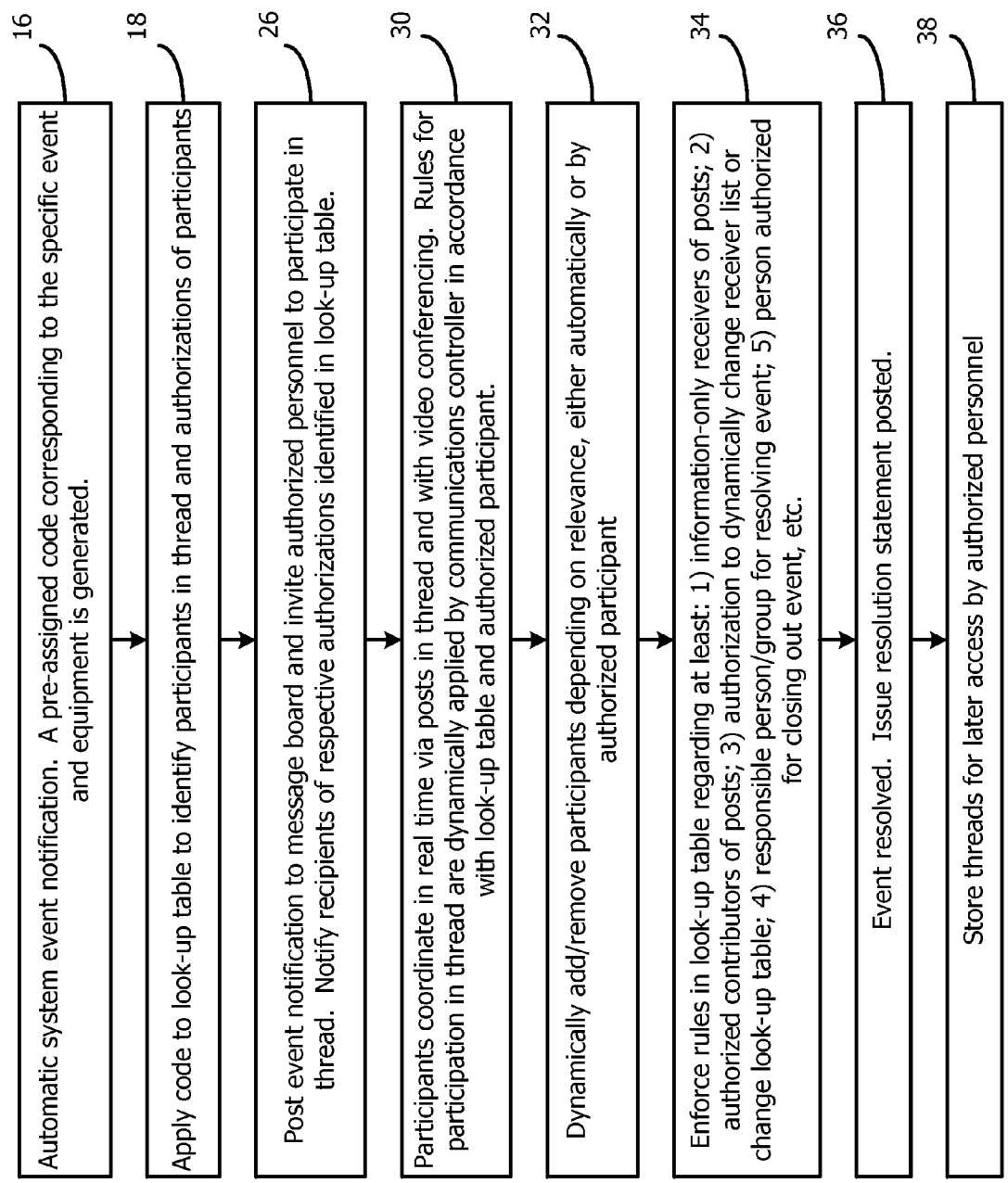
FIG. 2 is a flow chart identifying various steps performed in accordance with one embodiment of the invention.

FIG. 2 is a flowchart identifying various steps performed in the example. In step 16, the equipment 12 automatically generates a system event notification, where a pre-assigned event code, identifying the problem, is generated along with the equipment ID code for further processing. The codes will hereinafter be referred to as a single code.

In step 18, the automatically generated code is applied to pre-programmed look-up tables in the block 14 of FIG. 1. The look-up tables may be programmed by authorized personnel using special passwords and accessed by the network 20 in FIG. 1. The network 20 may be any network including a LAN, WAN (e.g., the Internet), etc.

The look-up table cross-references (or maps) the specific code with rules (also referred to as filters) to be applied to the code. Different codes may have different rules associated with them. In the examples of FIGS. 2 and 3, the rules include the identifications of the initial recipients of the automatically generated event post on the organization's social network, such as a particular secure website with various "rooms" or message boards. The website may include a plurality of maintenance message boards, and each message board may correspond to a specific event that has occurred. The message boards are identified in block 22 of FIG. 1, which is generally a memory. The recipients may be notified by e-mail, instant messaging, or other means via their associated computers 24 when there is a post, and the recipients may be instructed how to access the post and message board regarding the post using authorization codes.

In FIG. 1, a communications controller 26 accesses the rules from the block 14 associated with the event code, transmits the notifications to the authorized personnel in accordance with the rules, and controls subsequent communications between the various computers 24 (associated with the authorized personnel) and the message boards 22.

In step 26, the event notification is automatically posted to a special message board that may be set up specifically for the current event, and the authorized personnel are notified of the event and message board. The recipients are then invited to coordinate the solving of the event by posting status information to the message board.

As shown in the simplified sample look-up table 28 of FIG. 3, the rules may identify the following for each event code: 1) the initial recipients of the post identifying the problem and the equipment; 2) the personnel who are allowed to contribute to the thread; 3) the recipients of the full thread; 4) the personnel who have access to the full thread but cannot participate; 5) the personnel who are allowed to dynamically change the participants in the thread (rather change the look-up table); 6) the personnel who are allowed to change the look-up table; and 7) the personnel who are allowed to close out the event. The look-up table contents may be displayed to the recipients.

In the example of FIG. 3, the individuals or groups of individuals identified as A-G are identified for various authorizations for the event codes $$$123 and ###123, identifying actual problems with the equipment. In the example of the event code $$$123 in FIG. 3, the person identified as A may be a supervisor and just needs the high level information about the problem, so is given access to all the threads but is not bothered with receiving all updates regarding the thread. The supervisor A is given full authority to change the look-up table 28, such as based on changes in personnel, and authority to close out the event. On the other hand, the personnel identified as B and C may be the technicians that are tasked with resolving the problem and need full access and notifications regarding the thread. The individuals labeled A-G may actually be addresses of the computers, or e-mails addresses, or other social media addresses associated with the authorized personnel (for receiving notifications) and their user names (for granting access to the threads, etc.). Access to the threads may be determined by applying to the rules the user name entered by the authorized individual when accessing the thread. If the user name is authorized, the communications controller 26 grants access to the thread. Any of these ways to identify authorized personal is referred to as "identifying authorized personnel" even though their computers or their user names may be identified as representing the authorized personnel.

As shown in step 30, once the automatically-generated post is created by the equipment 12 and the posting/participation rules are selected by the block 14, the authorized participants coordinate via the message board in real time. Video conferencing may also be used. The communications controller 26 controls the access to the message board 22, via user names, etc., to enforce the rules, and the communications controller 26 informs the authorized personnel of the status of the thread.

In step 32, authorized personnel may dynamically add or remove participants depending on the relevance of the personnel at that particular time. The add/removal may also be done automatically in accordance with the rules.

In step 34, the rules specified by the look-up table 28 are enforced by the communications controller 26.

In step 36, the authorized personnel have fixed the problem and have the authorization to issue a resolution statement.

In step 38, the threads (or message board associated with the event) is stored for later access, such as to refer to if a similar event occurs.

FIG. 4 illustrates a simple thread initiated by a server, with the initial post, beginning the thread, being generated by the server (or other equipment) and identifying the server ID, the problem, the time, and the date. The post may be automatically placed in a message board associated with that particular server or associated with that particular problem, so the thread can be easily accessed again if the same problem results.

The post is communicated to the personnel identified in the look-up table 28, and, in the example, the technicians B and C coordinate the fixing of the problem, and the supervisor A closes out the event with a resolution post.

The mapping in the table may be for any combination of individuals or groups (e.g., the designation B may include all personnel in group B), where all personnel in the group receive the same communication as a broadcast.

The invention is equally applicable to all equipment that initiates a post without human involvement.

While particular embodiments of the present invention have been shown and described, it will be obvious to those skilled in the art that changes and modifications may be made without departing from this invention in its broader aspects and, therefore, the appended claims are to encompass within their scope all such changes and modifications that are within the true spirit and scope of this invention.

What is claimed is:

1. A method performed by a system for aiding in the resolution of an event requiring maintenance of equipment, the method comprising:
   automatically generating an event code associated with equipment indicating that an event has occurred that requires maintenance of the equipment;
   automatically posting initial information about the event on a communications site for access by one or more authorized personnel via a network;
   applying the event code to a look-up table pre-programmed with rules identifying authorizations of certain personnel to receive posted information regarding the event and to contribute to a posting thread originated by the posted initial information, wherein the rules identify at least: 1) initial recipients of the post identifying the initial information about the event, where the initial recipients do not all receive a full thread, and 2) personnel who are allowed to contribute to the thread, which are a subset of the initial recipients;
   automatically informing authorized personnel of the event in accordance with the rules;
   allowing authorized personnel, as determined by the rules, to participate in the thread in furtherance of resolving the event; and
   allowing authorized personnel to dynamically modify the rules after the posting of the initial information, wherein dynamically modifying the rules comprises the authorized personnel changing the rules relating to personnel other than the authorized personnel.

2. The method of claim 1 wherein the step of automatically posting initial information about the event on a communications site comprises automatically posting the initial information about the event on a message board in a web site via the Internet.

3. The method of claim 1 wherein the step of automatically posting initial information about the event on a communications site comprises automatically posting the initial information about the event on a message board in a private communications network.

4. The method of claim 1 wherein the step of allowing authorized personnel to dynamically modify the rules after the posting of the initial information comprises allowing authorized personnel to change recipients of the posting thread after the posting of the initial information.

5. The method of claim 1 wherein the event code comprises a malfunction code.

6. The method of claim 1 wherein the certain personnel comprise technical support personnel.

7. The method of claim 1 wherein the event code is generated by a server.

8. The method of claim 1 wherein the step of allowing authorized personnel, as determined by the rules, to participate in the thread in furtherance of resolving the event is performed by a communications controller that enforces the rules in the look-up table.

9. The method of claim 1 wherein different authorized personnel are identified by the rules for different event codes.

10. The method of claim 1 wherein the event codes identify specific equipment and a particular issue concerning the equipment.

11. The method of claim 1 wherein the rules identify at least: 1) initial recipients of the post identifying the initial information about the event; 2) personnel who are allowed to contribute to the thread; 3) recipients of the full thread; and 4) personnel who are allowed to dynamically change the participants in the thread.

12. The method of claim 1 wherein the authorized personnel comprise groups of personnel.

13. A system for aiding in the resolution of an event requiring maintenance of equipment, the system comprising:
   first equipment automatically generating an event code indicating that an event has occurred that requires maintenance of the first equipment;
   a communications controller, which is connected to receive the event code and apply the event code to a look-up table pre-programmed with rules identifying authorizations of certain personnel to receive posted information regarding the event and to contribute to a posting thread regarding the event, wherein the rules identify at least: 1) initial recipients of the post identifying the initial information about the event, where the initial recipients do not all receive a full thread, and 2) personnel who are allowed to contribute to the thread, which are a subset of the initial recipients;
   the communications controller being configured to automatically post initial information about the event on a communications site for access by one or more authorized personnel via a network, according to the rules identified in the look-up table;

the communications controller being configured to allow authorized personnel, as determined by the rules, to participate in the thread in furtherance of resolving the event the rules; and the communications controller being configured to allow authorized personnel to dynamically modify the rules after the posting of the initial information, wherein dynamically modifying the rules comprises the authorized personnel changing the rules relating to personnel other than the authorized personnel.

14. The system of claim 13 wherein the communications controller is configured to post initial information about the event on a message board in a web site via the Internet.

15. The system of claim 13 wherein the communications controller is configured to post initial information about the event on a message board in a private communications network.

16. The system of claim 13 wherein the communications controller is configured to allow authorized personnel to change recipients of the posting thread after the posting of the initial information.

17. The system of claim 13 wherein the event code comprises a malfunction code.

18. The system of claim 13 wherein different authorized personnel are identified by the rules for different event codes.

19. The system of claim 13 wherein the rules identify at least: 1) initial recipients of the post identifying the initial information about the event; 2) personnel who are allowed to contribute to the thread; 3) recipients of the full thread; and 4) personnel who are allowed to dynamically change the participants in the thread.

20. The system of claim 13 wherein the first equipment comprises a server.

* * * * *